(12) United States Patent
Vig et al.

(10) Patent No.: US 7,242,775 B2
(45) Date of Patent: Jul. 10, 2007

(54) OPTICAL PULSE CALIBRATION FOR QUANTUM KEY DISTRIBUTION

(75) Inventors: Harry N. Vig, N. Billerica, MA (US); Alexei Trifonov, Boston, MA (US)

(73) Assignee: MagiQ Technologies, Inc., New York, NY (US)

(*) Notice: Subject to any disclaimer, the term of this patent is extended or adjusted under 35 U.S.C. 154(b) by 15 days.

(21) Appl. No.: 10/706,815

(22) Filed: Nov. 12, 2003

(65) Prior Publication Data

US 2005/0111667 A1    May 26, 2005

(51) Int. Cl.
*H04L 9/00* (2006.01)

(52) U.S. Cl. .................. 380/263; 380/278; 713/300

(58) Field of Classification Search ............ 380/277, 380/278, 279, 256, 255, 263, 44, 47; 359/237, 359/238, 244, 246, 248

See application file for complete search history.

(56) References Cited

U.S. PATENT DOCUMENTS

| | | | | |
|---|---|---|---|---|
| 4,359,622 A | * | 11/1982 | Dostoomian et al. | 219/110 |
| 4,544,274 A | * | 10/1985 | Cremers et al. | 356/436 |
| 4,545,018 A | * | 10/1985 | Clements et al. | 700/166 |
| 5,307,410 A | * | 4/1994 | Bennett | 380/256 |
| 5,515,438 A | * | 5/1996 | Bennett et al. | 380/278 |
| 5,900,983 A | * | 5/1999 | Ford et al. | 359/627 |
| 5,953,421 A | * | 9/1999 | Townsend | 380/283 |
| 6,061,171 A | | 5/2000 | Taylor et al. | |
| 6,438,234 B1 | * | 8/2002 | Gisin et al. | 380/256 |
| 6,600,594 B1 | | 7/2003 | Ko | |
| 6,683,958 B2 | * | 1/2004 | Petrovic | 380/238 |
| 6,778,779 B1 | * | 8/2004 | Shay et al. | 398/41 |
| 6,812,464 B1 | * | 11/2004 | Sobolewski et al. | 250/336.2 |
| 6,826,419 B2 | * | 11/2004 | Diab et al. | 600/336 |
| 2002/0025041 A1 | * | 2/2002 | Tomita | 380/256 |

FOREIGN PATENT DOCUMENTS

EP    1 134925 A2    9/2001

OTHER PUBLICATIONS

Stucki et al, "Quantum Key Distribution over 67 km with a plug and play system," New Journal of Physics 4 (2002) 41.1-41.8.

Jin et al., "Feed back controlled variable optical attenuator for channel power regulation in WDM Systems," lec lett. vol. 35 No. 11 May 27, 1999.

\* cited by examiner

*Primary Examiner*—Christopher Revak
*Assistant Examiner*—Eleni Shiferaw
(74) *Attorney, Agent, or Firm*—Opticus IP Law PLLC

(57) ABSTRACT

Methods and systems for generating calibrated optical pulses in a QKD system. The method includes calibrating a variable optical attenuator (VOA) by first passing radiation pulses of a given intensity and pulse width through the VOA for a variety of VOA settings. The method further includes resetting the VOA to minimum attenuation and sending through the VOA optical pulses having varying pulse widths. The method also includes determining the power needed at the receiver in the QKD system, and setting the VOA so that optical pulses generated by the optical radiation source are calibrated to provide the needed average power. Such calibration is critical in a QKD system, where the average number of photons per pulse needs to be very small—i.e., on the order of 0.1 photons per pulse—in order to ensure quantum security of the system.

11 Claims, 5 Drawing Sheets

OPTICAL PULSE CALIBRATION FOR QUANTUM KEY DISTRIBUTION

FIELD OF THE INVENTION

The present invention relates to quantum cryptography, and in particular relates to calibrating the intensity of optical pulses in quantum key distribution (QKD) systems.

BACKGROUND OF THE INVENTION

Quantum cryptography involves exchanging messages between a sender ("Alice") and a receiver ("Bob") by encoding a plain text message with a key that has been shared between the two using weak (e.g., 0.1 photon on average) optical signals (pulses) transmitted over a "quantum channel." Such a system is referred to as a quantum key distribution (QKD) system. The security of QKD systems is based on the quantum mechanical principle that any measurement of a quantum system will modify its state. As a consequence, an eavesdropper ("Eve") that attempts to intercept or otherwise measure the quantum signal will introduce errors into the transmitted signals, thereby revealing her presence. Because only the key is transmitted in a QKD system, any information about the key obtained by an eavesdropper is useless if no message based on the key is sent between Alice and Bob.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175–179 (IEEE, New York, 1984). A "one-way" QKD system is described in U.S. Pat. No. 5,307,410 to Bennet (the '410 patent). A two-way (i.e., folded) QKD system is described in U.S. Pat. No. 6,438,234 to Gisin.

A crucial aspect of creating a commercially viable QKD system is ensuring that the optical pulses sent over the quantum channel have a known intensity. The average number of photons in a given pulse needs to be set to a known quantity, and needs to be less than one. To achieve such low-intensity pulses, a light source (e.g., a laser) is used to emit relatively. high-intensity pulses, and an optical attenuator is used to attenuate the pulses down to the single-photon level.

While people generally understand that optical pulses need to be attenuated in QKD, the practical aspects of performing the needed attenuation tend to remain unappreciated and overlooked. In the quantum cryptography literature, when an attenuator is included as part of a QKD system, its operation is not described in any significant detail. This is because it is generally assumed that prior art attenuation methods, such as those used in optical telecommunications, can be directly applied to QKD systems to achieve optical pulse calibration.

Such assumptions may be true for experimental or prototype. QKD systems, where the precise intensity of the pulses is not a major concern and the instrumentation is in a very well controlled environment. However, for a commercially viable QKD system, it is crucial that the optical pulses have well-controlled intensities in order to create a select number of photons per pulse on average (e.g., 0.1 photons per pulse.) over a long period of time, and under a wider set of environmental factors. If the pulses are too strong, they will no longer be at the single-photon level and the security of the QKD is compromised. On the other hand, if the pulses are too weak, then, many pulses will go undetected, which reduces the key transmission rate.

A laboratory QKD system can be tuned to each individual test setup. A commercially viable QKD system will have sources of loss that arise from a number of internal and external factors, such as quantum channel inherent loss, environmental effects, fiber splices, fiber type and length, etc., that are different for each installation. This makes the process of providing pulses with a well-defined, small intensity quite daunting—to the point where the prior art methods for attenuating optical signals used in other optical technologies are not applicable to a high-performance, commercially viable QKD system.

In addition, the self-discovery aspect of setting up a commercial QKD system is simplified by the ability to provide both strong and weak optical pulses. The use of stronger optical pulses for self-calibration and set-up of a QKD system is currently neglected in the prior art.

SUMMARY OF THE INVENTION

The calibration systems and methods of the present invention take into account the low power levels (i.e., small average number of photons per pulse), and variations in the optical pulse width of the pulses used in QKD systems.

A first aspect of the invention is a method of generating calibrated optical pulses for a quantum key distribution (QKD) system. The method includes generating first optical pulses having a fixed pulse width and a fixed power using an optical radiation source, and passing the first pulses through a variable optical attenuator (VOA) for different VOA settings. The transmitted powers of the first optical pulses are related to the respective VOA settings and the information is stored in the controller, e.g., as a look-up table. The method also includes setting the VOA to a minimum attenuation by operation of the controller, generating second optical pulses having varying pulse widths using the optical radiation source, and sending the second pulses through the VOA. The method further includes relating, respective transmitted powers of the second optical pulses to the respective varying pulse widths and storing the results in the controller. The method additionally includes determining an amount of average power needed to be incident a receiver of the QKD system, setting the VOA to a calibrated setting that would result in the receiver receiving the needed amount of average power via third radiation pulses, and then sending the third optical pulses from an optical radiation source through the VOA to create a calibrated set of optical pulses.

A second aspect of the invention is a calibrated QKD system, which can be a one-way system or a two-way (autocompensated) system. The system comprises first and second stations optically coupled via an optical channel, and optical radiation source located in the first station and capable of generating optical pulses that travel in the optical channel between the stations. The system also includes a variable optical attenuator (VOA) arranged in the first station for a one-way system or in the second station for a two-way system. The system also includes a VOA driver operatively couple to the VOA, and an electrical meter operatively coupled to the VOA. A controller is operatively coupled to the VOA, the VOA driver, the optical radiation source and the electrical meter. The VOA is automatically set by the controller using a calibration table stored in the controller, and an average amount of power expected at the receiver. The receiver is located in the second station for a one-way system and is located in the first station for a two-way system. The result is the production of calibrated optical pulses from the optical pulses output by the optical radiation source.

DETAILED DESCRIPTION OF THE INVENTION

The present invention is a system and method for optical pulse calibration in a QKD system. The systems and methods apply to both one-way and two-way systems. For the sake of convenience, the invention is first described in connection with a one-way system.

Figure 1:
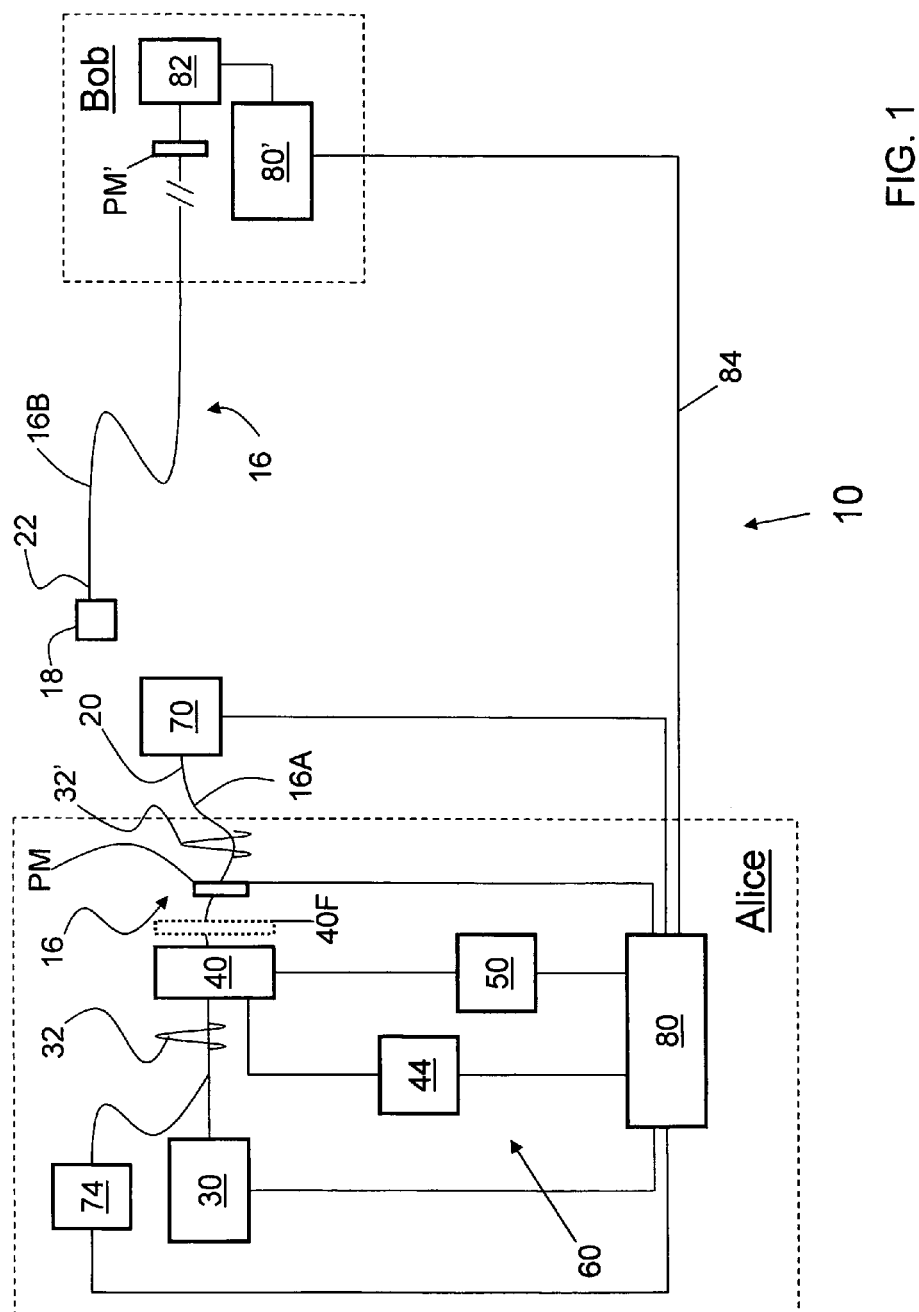
FIG. 1 is a schematic diagram of a QKD system that includes a variable optical attenuator system, as configured for calibrating the variable optical attenuator.

FIG. 1 is a schematic diagram of a QKD system 10 having a first station Alice and a second station Bob. Alice and Bob are optically couple via an optical channel 16, which may be an optical fiber or free space. Optical channel 16 includes first and second optical channel portions 16A and 16B connected by a connector 18. Channel 16A has an end 20 and channel 16B has an end 22. Connector 18 allows for the optical-channel to be separated downstream of a VOA (discussed below) and accessed in order to perform the calibration procedures of the present invention, as described below. In FIG. 1, optical channel 16 is shown disconnected at coupler 18.

Alice includes an optical radiation source 30 capable of generating optical pulses 32. Optical radiation source 30 is capable of controlling the pulse widths w and pulse rate r of optical pulses 32. In an example embodiment, optical radiation source 30 is a gain switched communications laser. In an example embodiment, the pulse widths of optical pulses 32 can range between 10 ps and 10 ns and the pulse rate varies from 100 kHz to 20 MHz.

A variable attenuator (VOA) 40 is optically coupled to the optical radiation source and is arranged to receive and selectively attenuate optical pulses 32 to form attenuated pulses 32'. A driver 44 is operatively connected to VOA 40. Driver 44 drives or otherwise sets VOA 40 to a select level of attenuation $A_i$ within the range of possible attenuations of the VOA. In an example embodiment, VOA 40 includes a no-attenuation or a substantially no-attenuation setting $A_{MIN}$.

In example embodiments, VOA 40 is any one of a number of known VOAs, such as an electronically controlled LCD shutter or a mechanically controlled coupler, such as an optical fiber coupler that sets the alignment between two optical fibers to correspond to a given level of attenuation.

In system 10, it is convenient to identify a VOA calibration system 60, which includes VOA 40 and driver 44. VOA calibration system 60 also includes an electrical meter 50 connected to VOA 40 to measure the electrical feed back from the VOA.

VOA calibration system 60 further includes an optical power meter 70, temporarily coupled to channel portion end 20, for measuring optical power (e.g., watts W) or intensity (Watts/cm$^2$) of optical radiation incident thereon. Power meter 70 need not be a single-photon detector. By measuring the power of the pulses with no attenuation, and measuring the attenuation with a strong pulse sent through the attenuator, the single-photon level power can be calculated without the sensitive equipment ordinarily required to make single-photon level measurements. This is particularly important because single-photon detectors only detect the arrival of a photon (as opposed to the actual number of photons) in given time interval.

In an example embodiment, a single-photon detector 74, which is internal to Alice and coupled (e.g., spliced) to optical channel portion 16A, is used rather than a separate power meter 70. The internal single-photon detector 74 can also be used during system operation to double check, that the calibration has not been adjusted either by accident or maliciously to leak information by creating multiple-photon optical pulses. In the case where single-photon detector 74 is used, optical pulses 32 need to be reflected so that they pass back through VOA 40. This can be accomplished by replacing power meter 70 with a mirror, or by keeping optical channel 16 intact and reflecting the pulses back from a mirror (not shown) located within Bob.

VOA calibration system 60 also includes a controller 80, which also controls the operation of Alice. Controller 80 is operatively connected to optical radiation source 30, VOA driver 44, electrical meter 50, detector 74, and power meter 70, and controls the operation of these components. Controller 80 is also coupled to a controller 80' at Bob via a timing/synchronization link 84 so that the operation of the QKD system is synchronized between the two stations. In this sense, controller 80 and controller 80' can be considered as a single controller. Controller 80' is coupled to a detector 82 located in Bob that detects the weak optical pulses 32 after they have been polarization-modulated or phase-modulated by polarization or phase modulators PM and PM' located in Alice and Bob, respectively.

Thus, to summarize, attenuator 60 includes VOA 40, driver 44, electrical meter 50 and controller 80.

Figure 2:
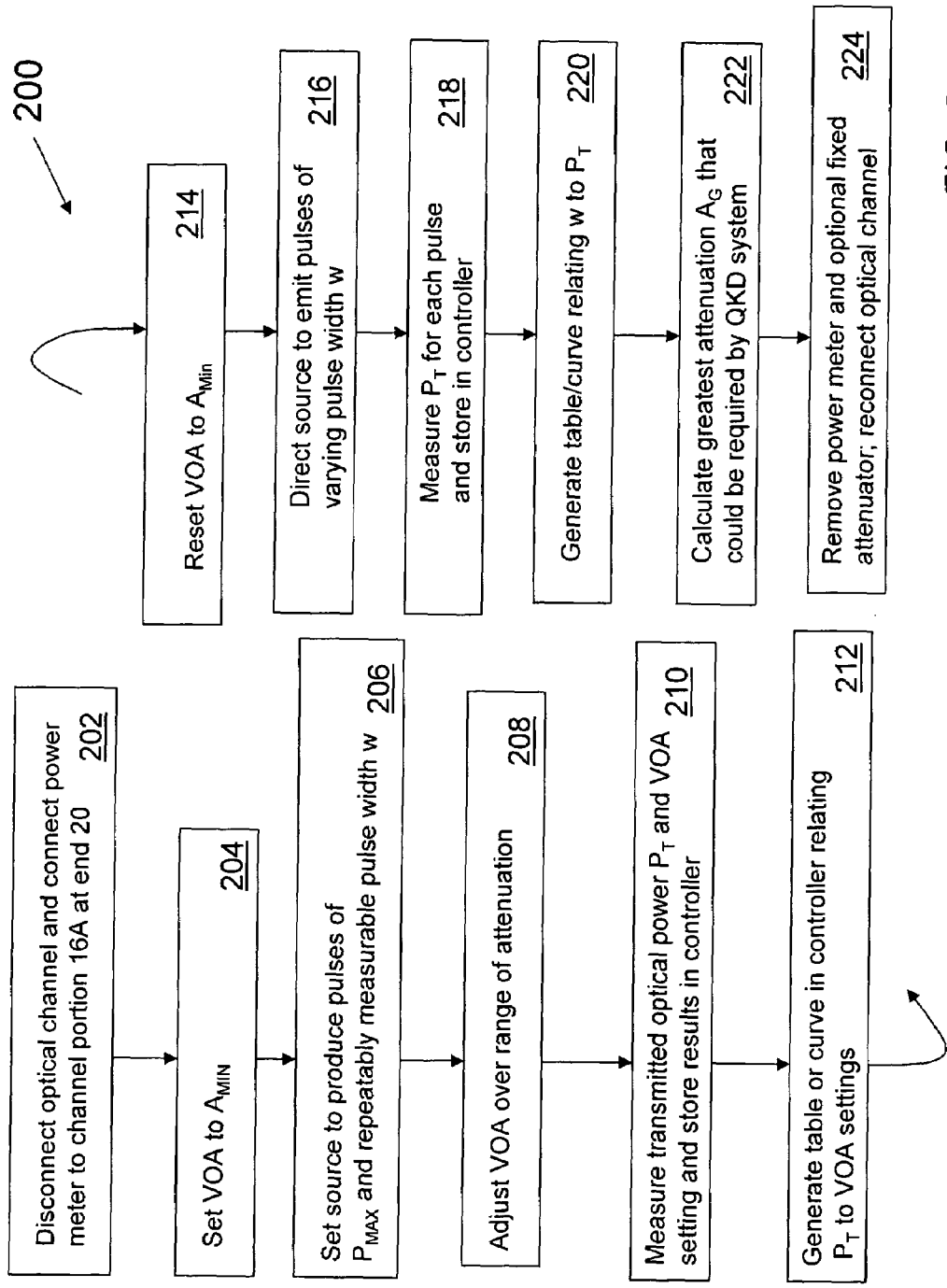
FIG. 2 is a flow diagram of the method of calibrating the attenuator system in the QKD system of FIG. 1.

With continuing reference to FIG. 1 and also to FIG. 2 and flow diagram 200 therein, the general method of the present invention is now described. In 202, optical channel 16 is disconnected and power meter 70 is optically coupled to channel portion 16A at end 20. In 204, controller 80 sends a control signal to driver 44, which in turn communicates with VOA 40 to set the VOA to its minimum attenuation $A_{MIN}$. In 206, controller 80 sends a control signal to optical radiation source 30 which sets the optical power output to a high, fixed power (E.g., maximum power $P_{MAX}$) and sets the pulse width w to obtain repeatable measurements on optical power meter 70. Thus, the pulses emanating from the optical radiation source have maximum power, $P_{MAX}$ and thus the maximum number of average photons per pulse $m_{MAX}$.

In 208, VOA 40 is adjusted (e.g., swept or stepped) over a range of attenuation, e.g., from its maximum attenuation $A_{MAX}$ to its minimum attenuation $A_{MIN}$. In 210, as VOA 40 is adjusted, the output optical power $P_T$ of the optical pulses 32' transmitted by VOA 40 is measured by power meter 70 for each VOA setting. Power meter 70 produces electrical signals corresponding to the measured power. The electrical signals are sent to controller 80. Also in 210, the electrical feedback from VOA 40 as measured by electrical meter 50 and that corresponds to the VOA settings is sent to controller 80 via electrical signals. Further in 210, the information, in the electrical signals corresponding to the measured optical power transmitted by the VOA and the VOA settings are stored (recorded) in controller 80.

In 212, controller 80 generates a table or curve that relates the relative power transmitted by the VOA 40 to the VOA position or setting. In 214, controller 80 sends a control signal to driver 44 that causes driver 44 to set VOA 40 to its minimum attenuation $A_{MIN}$. In 216, controller 80 sends a control signal to optical radiation source 30 to cause the optical radiation source to emit optical pulses that vary in pulse width w over a range of pulse widths that vary from a minimum to a maximum usable pulse width.

In 218, power meter 70 receives and measures (detects) the optical pulses 32' and sends electrical signals to controller 80 that correspond to the detected power $P_T$ for each of the optical pulses. In an example embodiment, the pulse rate r is higher than that used in QKD system 10 since the QKD system rate is limited by the single-photon detectors, not the optical radiation source This raises the average power level so that a better measurement of the power in the optical pulses 32' can be obtained by the power meter. Also in 218, the information in signals from power meter 70 is recorded (stored) in controller 80.

In 220, controller 80 generates a calibration table or curve that relates the optical pulse width w to the corresponding power level $P_T$ measured for the optical pulses. In practice, the optimal (best) pulse width depends on the system operating conditions.

In 222, controller 80 calculates the greatest amount of attenuation $A_G$ that might be required for a given system configuration or set of operating conditions. In an example embodiment, a fixed attenuator 40F (dotted line, FIG. 1) having a known attenuation, is added in series with VOA 40 to ensure that all system configurations can be met with the appropriate amount of attenuation in view of the possible adjustment range of the optical radiation source.

Once step 222 is carried out, the calibration of attenuator system 60 needed to perform pulse calibration is complete. In 224, optional fixed attenuator 40F is removed, power meter 70 is disconnected from optical channel portion 16A, and optical channel portions 16A and 16B are connected (e.g., using connector 18) to form an unbroken optical channel 16 between Alice and Bob.

Figure 3:
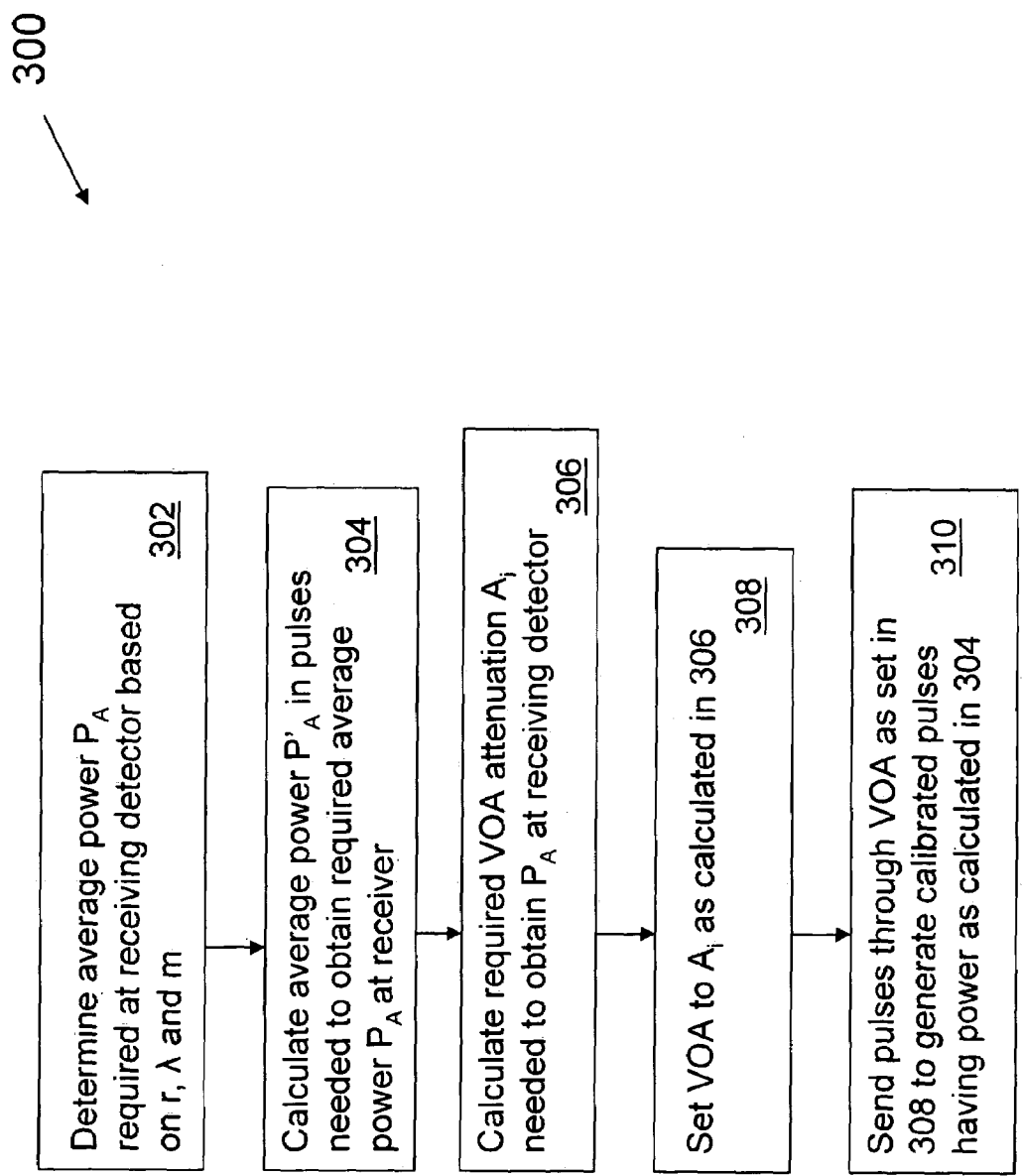
FIG. 3 is a flow diagram of the method of generating calibrated optical pulses in the QKD system of FIG. 1 using the calibrated attenuator system therein.

FIG. 3 is a flow diagram 300 of the method of using QKD system 10 to generate optical pulses having a desired average number of photons per pulse m (i.e., "calibrated optical pulses") by using calibrated attenuator system 60.

In 302, an average power $P_A$ desired at the receiving detector 82 is decided upon. This average power may be, for example, the lowest power that can be consistently detected. The average power $P_A$ depends on the pulse repetition rate r, wavelength λ of optical radiation emitted by optical radiation source 30, and the desired average number of photons per pulse m, where m is typically less than 1, and further, is typically about 0.1

In 304, the average power $P'_A$ needed in each optical pulse outputted by optical radiation source 30 to achieve the desired average power $P_A$ at receiving detector 82 is calculated, taking into account the system attenuation, losses, and the pulse width w of each pulse. In 306, the amount of attenuation $A_i$ needed to be added by VOA 40 to achieve the desired amount of average power $P_A$ (or the desired average number of photons m) in each optical pulse 32' at receiver 82 is calculated. In 308, controller 80 directs driver 44 to set VOA 40 to the needed amount of attenuation $A_i$ based on the calibration data (i.e., table or curve) as determined using the method illustrated in flow diagram 200 of FIG. 2. At this point, system 10 is set up to generate optical pulses 32' have a well-defined (i.e., calibrated) average number of photons per pulse $m_C$.

Figure 4:
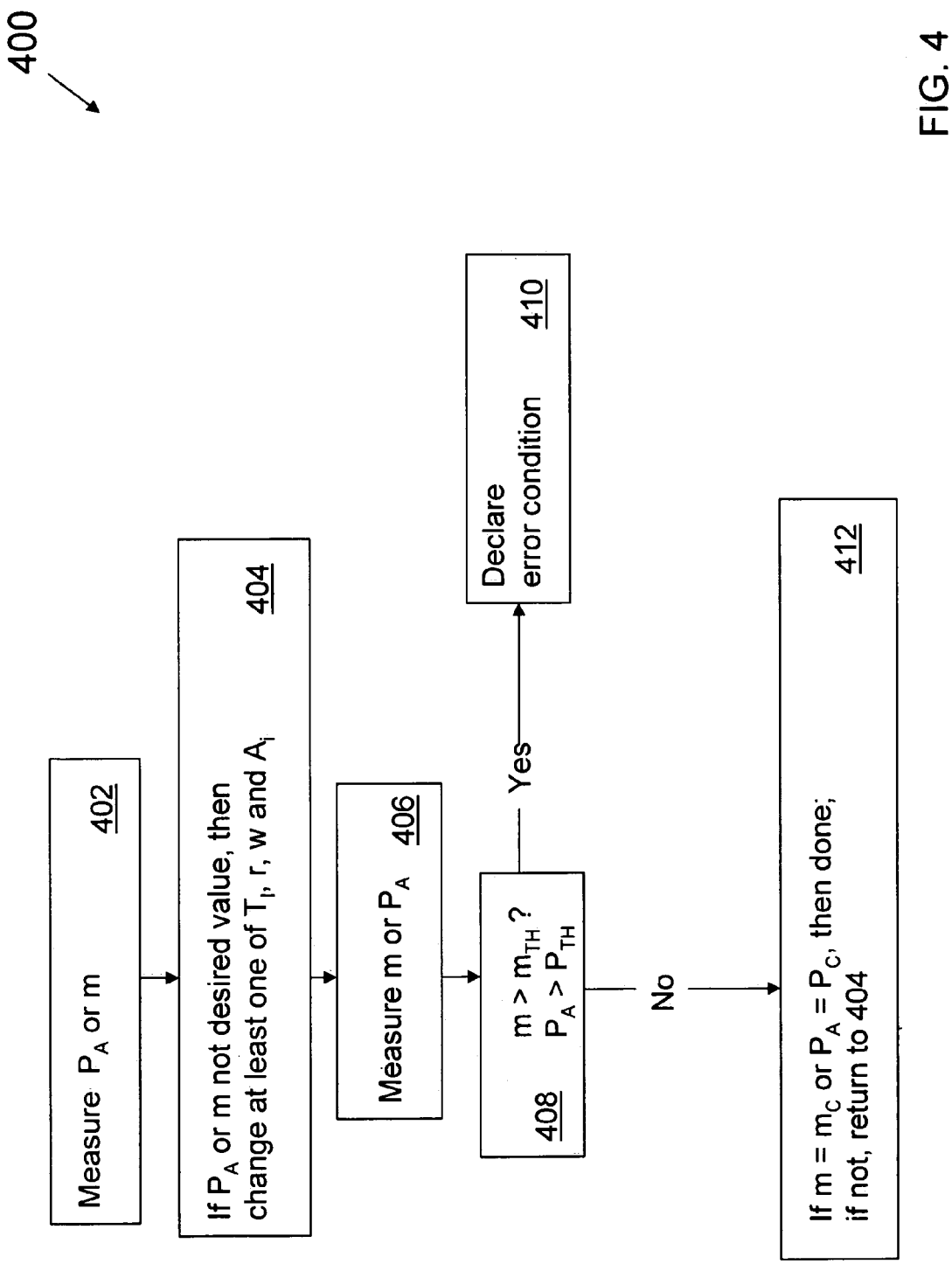
FIG. 4 is a flow diagram of the method of ensuring continued calibration of the optical pulses in the QKD system of FIG. 1 during system operation.

FIG. 4 is a flow diagram 400 of a method according to the present invention of ensuring that the optical pulses remain calibrated during the operation of system 10. In 402, the average power $P_A$ per optical pulse or average number of photons per optical pulse m is measured. This can be done in one of two preferred ways. In a first example embodiment, optical channel 16 is disconnected and power meter 70 is connected to end 20 of optical channel 16A. This approach is used to measure the average power $P_A$. In a second example embodiment, optical channel 16 is not disconnected and the average power in the optical pulses are measured by the (single-photon) receiving detector 82 at Bob or single-photon detector 74 in Alice. The second example embodiment is preferred in situations where QKD system 10 needs to stay intact or where it is otherwise advantageous not to disconnect optical channel 16.

In 404, if the measured average power $P_A$ or average of number of photons m differs from a desired (e.g., previously calibrated) value $P_D$ or $m_D$, then one or more of the following adjustments are made: (a) increasing or decreasing the integration time $T_I$ of receiving detector 82, (b) increasing or decreasing the pulse repetition rate r, (c) increasing or decreasing the optical pulse width w, and (d) increasing or decreasing the attenuation provided by VOA 40 by a select amount in accordance with the calibration table or curve stored in controller 80.

In 406, the average number of photons per pulse m or average power $P_A$ is measured after the one or more adjustments in 404. In 408, the measurements obtained in 406 are compared to a threshold value $P_{TH}$ or $m_{TH}$ for the average number of photons per optical pulse m (e.g., $m_{TH}$=1 photon per pulse), above which the security of the transmitted keys in the QKD system is deemed to be compromised.

In 410, if the threshold value $m_{TH}$ or $P_{TH}$ is exceeded, an error condition is declared and any bits associated with the threshold violation are not used in the key. This error alarm function is correlated against the system measurement activity to ensure false alarms are not given.

In 412, if m<$m_{TH}$ has the calibrated value $m_C$ (or if PA has the calibrated cm 1 average power value $P_C$), then the re-calibration process is terminated. If m≠$m_C$ (or $P_A$≠$P_C$), then the process returns to 404 and is repeated until m=$m_C$ (or $P_A$=$P_C$).

Figure 5:
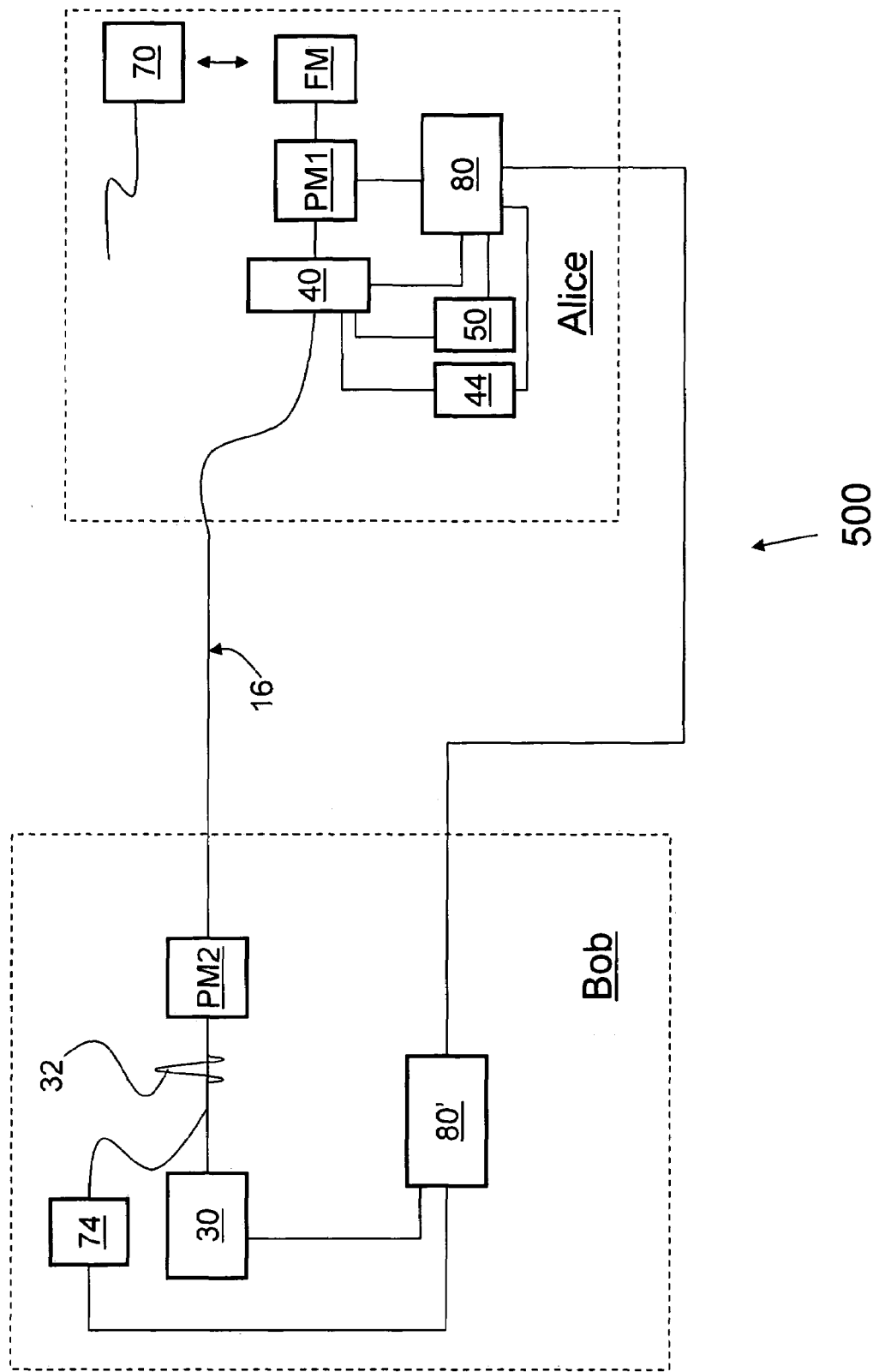
FIG. 5 is a schematic diagram of a two-way QKD system to illustrate that the method of calibration is general and applies to both one-way and two-way QKD systems.

It will be apparent to one skilled in the art that the above-described method applies to both one-way and two-way QKD systems. FIG. 5 is a schematic illustration of a two-way QKD system 500, such as described in U.S Pat. No. 6,438,234 to Gisin. In system 500, Bob's optical radiation source 30 sends Alice two unmodulated optical pulses, which both reflect from a Faraday mirror FM at Alice. One pulse is then randomly phase-modulated by Alice by PM1 on its way back to Bob, whereupon Bob phase encodes the remaining unmodulated pulse with his phase modulator PM2. The pulses are then combined (interfered) at Bob and detected to ascertain the phase differences in the two interfered pulses.

For the purposes of optical pulse calibration, the only significant difference from a one-way system is that the VOA 40 is located at Alice, while the optical radiation source 30 is located at Bob. Thus, in an example embodiment, in a two-way system, the Faraday mirror at Alice is replaced with power meter 70, and the calibration carried out using Alice's controller 80' and/or Bob's controller 80.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A method of generating calibrated optical pulses in a quantum key distribution (QKD) system, comprising:
   sending first optical pulses having a fixed pulse width and a fixed power through a variable optical attenuator (VOA) for different VOA settings, and relating respective transmitted powers of the first optical pulses to respective said VOA settings;
   setting the VOA to a minimum attenuation;
   directing second optical pulses having varying pulse widths through the VOA and relating respective transmitted powers of the second optical pulses to the respective varying pulse widths;
   determining a first average power required for third optical pulses outputted by a optical radiation source in order to obtain a second average power for each third optical pulse at a receiver of the QKD system;
   determining a calibrated attenuation setting of the VOA that results in each third optical pulse having the first average power;
   automatically setting the VOA to the calibrated attenuation setting; and
   sending the third optical pulses through the VOA to create calibrated optical pulses.

2. The method according to claim 1, wherein the receiver of the QKD system is connected to the optical radiation source by an optical channel, and including:
   disconnecting the optical channel downstream of the VOA to measure the transmitted powers of the first optical pulses using a power meter connected to an open end of the optical channel downstream of the VOA; and
   reconnecting the optical channel prior to creating the calibrated optical pulses.

3. The method of claim 1, wherein the receiver has an integration time $T_I$, the third optical pulses have a repetition rate r and a pulse width w, and further including ensuring calibration by:
   periodically measuring an average number of photons m per third optical pulse using a single-photon detector; and
   if the measured average number of photons m per third optical pulse is not equal to a desired average number $(m_D)$ of photons per pulse, then changing at least one of: (i) the integration time $T_I$, (ii) the pulse repetition rate r, (iii) the optical pulse width w, and (iv) the VOA setting.

4. The method of claim 3, further including: comparing the measured average number of photons m per third optical pulse to a threshold average number of photons per optical pulse $m_T$ to ensure quantum security of the QKD system.

5. A method of generating calibrated optical pulses for a quantum key distribution (QKD) system, comprising:
   generating first optical pulses having a fixed pulse width and a fixed power using an optical radiation source;
   passing the first pulses through a variable optical attenuator (VOA) for different VOA settings, relating respective transmitted powers of the first optical pulses to respective said VOA settings, and storing the related transmitted powers and VOA settings in a controller;
   generating second optical pulses having varying pulse widths using the optical radiation source and sending the second pulses through the VOA set at a minimum attenuation;
   relating respective transmitted powers of the second optical pulses to the respective varying pulse widths and storing the results in the controller;
   determining an average power needed to be incident a receiver of the QKD system;
   setting the VOA to a calibrated setting that would result in the receiver receiving the needed average power via third optical pulses; and
   sending the third optical pulses through the VOA to create a calibrated set of optical pulses.

6. The method of claim 5, further including:
   disconnecting an optical channel connecting the optical radiation source with the receiver in order to measure the transmitted powers of the first optical pulses upon passing through the VOA for the respective setting; and
   reconnecting the optical channel prior to sending the third optical pulses through the VOA when creating the calibrated set of optical pulses.

7. A method of generating calibrated pulses for a quantum key distribution (QKD) system using a variable optical attenuator (VOA), comprising:
   a) relating transmitted powers of first optical pulses passed through the VOA to respective VOA settings;
   b) relating transmitted powers of second optical pulses having varying pulse widths and passed through the VOA set at a fixed attenuation, to the respective varying pulse widths; and
   c) based on the relations established in a) and b), setting the VOA to provide calibrated pulses having a select average power at a receiver based on third optical pulses output from a optical radiation source and having a select average power.

8. A one-way calibrated QKD system comprising:
   first and second stations optically coupled via an optical channel;
   an optical radiation source located in the first station and adapted to output optical pulses that travel in the optical channel between the stations;
   a variable optical attenuator (VOA) arranged in the first station downstream of the optical radiation source;
   a VOA driver operatively couple to the VOA;
   an electrical meter operatively coupled to the VOA;
   a controller operatively coupled to the VOA, the VOA driver, the optical radiation source and the electrical meter; and
   wherein the VOA is automatically set to a select value by the controller using a calibration table and an average power expected at a receiver in the second station in order to produce calibrated optical pulses from the optical pulses outputted by the optical radiation source.

9. The QKD system of claim 8, wherein the optical pulses emitted by the optical radiation source have a pulse width in the range between about 10 ps and about 10 ns, and an optical pulse rate in the range between about 100 kHz and about 20MHz.

10. A two-way calibrated QKD system comprising:
    first and second stations optically coupled via an optical channel;
    an optical radiation source located in the first station and adapted to output optical pulses that travel in the optical channel between the stations;

a receiving detector located in the first station;

a variable optical attenuator (VOA) arranged in the second station;

a VOA driver arranged in the second station and operatively couple to the VOA;

an electrical meter arranged in the second station and operatively coupled to the VOA; and a controller operatively coupled to the VOA, the VOA driver, the optical radiation source and the electrical meter; and wherein the VOA is automatically set to a select value by the controller using a calibration table stored therein and an average power expected at the receiving detector to produce calibrated optical pulses from the optical pulses outputted by the optical radiation source and sent to the second station to be modulated and returned to the first station.

11. The QKD system of claim 10, wherein the optical pulses outputted by the optical radiation source have a pulse width in the range between about 10 ps and about 10 ns, and an optical pulse rate between about 100 kHz and about 20 MHz.

* * * * *